United States Patent
Kumeta et al.

(10) Patent No.: US 9,790,387 B2
(45) Date of Patent: Oct. 17, 2017

(54) NON-AQUEOUS INK JET INK COMPOSITION

(71) Applicant: Seiko Epson Corporation, Tokyo (JP)

(72) Inventors: Hiroaki Kumeta, Matsumoto (JP); Kana Mitsuzawa, Kyoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/063,789

(22) Filed: Mar. 8, 2016

(65) Prior Publication Data

US 2016/0264804 A1 Sep. 15, 2016

(30) Foreign Application Priority Data

Mar. 13, 2015 (JP) .................. 2015-050544

(51) Int. Cl.
*C09D 11/36* (2014.01)
*C09D 11/38* (2014.01)
*C09D 11/322* (2014.01)

(52) U.S. Cl.
CPC ............ *C09D 11/36* (2013.01); *C09D 11/322* (2013.01); *C09D 11/38* (2013.01)

(58) Field of Classification Search
CPC ........ C09D 11/322; C09D 11/36; C09D 11/38
See application file for complete search history.

(56) References Cited

U.S. PATENT DOCUMENTS

| 2003/0192453 | A1 | 10/2003 | Ohkawa et al. |
| 2012/0040147 | A1* | 2/2012 | Komatsu ............... B41M 5/0011 428/195.1 |
| 2012/0176440 | A1* | 7/2012 | Watanabe ............ C09D 11/322 347/20 |
| 2012/0249666 | A1* | 10/2012 | Maki .................... C09D 11/322 347/20 |

FOREIGN PATENT DOCUMENTS

JP 2004-002666 A 1/2004

* cited by examiner

*Primary Examiner* — Veronica F Faison
(74) *Attorney, Agent, or Firm* — Harness, Dickey & Pierce, P.L.C.

(57) ABSTRACT

There is provided a non-aqueous ink jet ink composition, including a pigment, a non-aqueous solvent, and a surfactant, in which the ink composition contains an acetylene glycol-based surfactant having a HLB value of 1.0 to 6.0 as the surfactant.

7 Claims, No Drawings

NON-AQUEOUS INK JET INK COMPOSITION

BACKGROUND

1. Technical Field

The present invention relates to a non-aqueous ink jet ink composition containing a non-volatile solvent as a main component.

2. Related Art

In recent years, an ink jet recording apparatus for recording images or characters using fine ink droplets discharged from nozzles of an ink jet recording head has spread rapidly. As the ink used in such an ink jet recording apparatus for recording images or the like, various kinds of inks, such as an aqueous ink in which a color material (for example, pigment or dye) is dissolved or dispersed in a mixture of an organic solvent and water, a non-aqueous ink in which a color material is dissolved or dispersed in an organic solvent, and the like, have been used.

Among these inks, a non-aqueous ink based on a glycol ether-based solvent has been widely used in terms of being able to record an excellent image having good drying properties and water resistance to a low ink-absorbent recording medium (for example, a vinyl chloride film). Further, a non-aqueous ink based on an ester-based solvent or a hydrocarbon-based solvent has also been widely used in terms of this non-aqueous ink being excellent in drying properties, although having a problem of emitting odor. Moreover, a solvent having a higher boiling point has also been used for plain paper as a non-aqueous ink having low volatility.

Meanwhile, in the case where an image is recorded on plain paper using a non-aqueous ink having low volatility, a solvent indefinitely remains on the plain paper without being volatilized, and the remaining solvent component permeates into the plain paper, so as to allow a recording portion to appear from the backside of a recorded product. Therefore, there was a problem in that bleed-through occurs, or the remaining solvent component leaches from the recording portion.

For such a problem, for example, it is disclosed in JP-A-2004-002666 that a problem of bleed-through or oil bleeding on plain paper, and a problem of nozzle clogging can be simultaneously solved by devising the solvent composition of a non-aqueous ink composition containing a non-volatile solvent as a main component.

Meanwhile, in the aforementioned non-aqueous ink composition described in JP-A-2004-002666, it was seen that the bleed-through or oil bleeding on plain paper and the deterioration of reliability due to leaving were improved by devising the solvent composition. However, particularly, when increasing the concentration of pigment in order to obtain a high-color image, there was also a problem in that the ejection stability and storage stability of ink are deteriorated due to the occurrence of nozzle clogging.

SUMMARY

An advantage of some aspects of the invention is to provide a non-aqueous ink jet ink composition, by which sufficient optical density of an image can be obtained in the recording of the ink composition onto plain paper, and which maintains good ejection stability and storage stability, even when increasing the concentration of pigment.

The invention can be realized in the following aspects or application examples.

APPLICATION EXAMPLE 1

According to an aspect of the invention, there is provided a non-aqueous ink jet ink composition, including: a pigment; a non-aqueous solvent; and a surfactant, in which the composition contains an acetylene glycol-based surfactant having a HLB value of 1.0 to 6.0 as the surfactant.

According to the non-aqueous ink jet ink composition of Application Example 1, even in the case of increasing the concentration of the pigment in order to obtain sufficient optical density of an image, the acetylene glycol-based surfactant (hereinafter, referred to as "specific acetylene glycol-based surfactant) having a HLB value of 1.0 to 6.0 is adsorbed on the surface of the pigment to increase steric hindrance, thereby improving the dispersion stability of the pigment. Therefore, the aggregation of the pigment in the ink is reduced, so as to deteriorate thixotropic properties. Further, when the thixotropic properties deteriorate, a difference in viscosity due to shear rate decreases, and thus it is possible to ensure the continuous ejection stability of the ink, even in the case of increasing the concentration of the pigment. Moreover, when the ink composition contains the specific acetylene glycol-based surfactant, the wettability of the pigment itself increases to allow the pigment to have a high affinity for the non-aqueous solvent, so that the dispersion stability of the pigment is increased, and long-term storage stability is improved.

APPLICATION EXAMPLE 2

In the non-aqueous ink jet ink composition of Application Example 1, the non-aqueous solvent may contain a non-polar organic solvent having a 50% distillation point of 280° C. or lower and a polar organic solvent having a 50% distillation point of 300° C. or higher, and the total content of the non-polar organic solvent and the polar organic solvent in the non-aqueous solvent may be 60.0 mass % or more.

According to the non-aqueous ink jet ink composition of Application Example 2, in the case where the non-aqueous solvent contains the non-polar organic solvent having a 50% distillation point of 280° C. or lower, a solvent component is rapidly volatilized from the ink recorded on plain paper, and thus it is possible to effectively prevent bleed-through and oil bleeding. Further, in the case where the non-aqueous solvent contains the polar organic solvent having a 50% distillation point of 300° C. or higher, it is possible to prevent the drying properties of the ink from becoming too high. Moreover, in the case where the total content of these solvents in the non-aqueous solvent is 60.0 mass % or more, the drying properties of the ink becomes appropriate, and thus it is difficult to cause nozzle clogging in the vicinity of nozzles.

APPLICATION EXAMPLE 3

In the non-aqueous ink jet ink composition of Application Example 1 or 2, in the shear viscosity measurement of the ink composition at 20° C. by a rheometer, the difference in the shear viscosity of the ink composition between a shear rate of 20[1/s] and a shear rate of 50[1/s] may be 0.60 [mPa·s] or less.

According to the non-aqueous ink jet ink composition of Application Example 3, the difference in shear viscosity depending on the shear rate is sufficiently small. Therefore, when a force is applied to the aggregated pigment, the pigment is easily loosened, and thus the ejection stability of the ink is further improved.

APPLICATION EXAMPLE 4

In the non-aqueous ink jet ink composition of any one of Application Examples 1 to 3, the ratio of the content of the pigment to the content of the specific acetylene glycol-based surfactant ([the content of the pigment]/[the content of the specific acetylene glycol-based surfactant]) in the ink composition may be 0.1 or more and less than 3.0.

When the content ratio of the pigment to the specific acetylene glycol-based surfactant in the ink composition is within the above range, the specific acetylene glycol-based surfactant is sufficiently adsorbed on the surface of the pigment, and thus the ejection stability and storage stability of the ink composition become better.

APPLICATION EXAMPLE 5

In the non-aqueous ink jet ink composition of any one of Application Examples 1 to 4, the content of the pigment may be 5.0 mass % to 15.0 mass % with respect to the total mass of the ink composition.

According to the non-aqueous ink jet ink composition of Application Example 5, even in the case where the concentration of the pigment is increased than the normal concentration thereof, due to the action of the specific acetylene glycol-based surfactant, continuous ejection stability is improved, and long-term storage stability also becomes good. Further, when the concentration of the pigment is within the above range, it is possible to obtain sufficient optical density of an image.

APPLICATION EXAMPLE 6

In the non-aqueous ink jet ink composition of any one of Application Examples 2 to 5, the non-polar organic solvent may contain at least one selected from the group consisting of aliphatic hydrocarbons, alicyclic hydrocarbons, and aromatic hydrocarbons.

APPLICATION EXAMPLE 7

In the non-aqueous ink jet ink composition of any one of Application Examples 2 to 6, the polar organic solvent contains at least one selected from the group consisting of soybean oil methyl, soybean oil isobutyl, methyl oleate, ethyl oleate, isostearyl alcohol, oleyl alcohol, isopalmitic acid, isostearic acid, isoarachic acid, isohexacosanoic acid, isopropyl isostearate, methyl linoleate, isobutyl linoleate, and tall oil isobutyl.

DESCRIPTION OF EXEMPLARY EMBODIMENTS

Hereinafter, preferable embodiments of the invention will be described. The following embodiments describe an example of the invention. The invention is not limited to the following embodiments. Various modifications can be made within the scope without departing from the gist thereof. All of the components to be described below may not be essential components of the invention.

The term "image" in the invention refers to a pattern formed from a dot group, and the pattern includes a printing pattern, a pattern such as picture or figure, and a solid pattern.

The term "non-aqueous (ink jet) ink composition" in the invention refers to an ink composition containing an organic solvent as a main solvent and not containing water as a main solvent. The content of water in the ink composition is preferably 3 mass % or less, more preferably 1 mass % or less, still more preferably less than 0.05 mass %, still more preferably less than 0.01 mass %, still more preferably less than 0.005 mass %, and most preferably less than 0.001 mass %. On the other hand, the non-aqueous ink composition may be an ink composition that does not substantially contain water. The meaning "water is not substantially contained" indicates that water is not intentionally contained, and does not exclude the cases where impurities or water is inevitably contained.

1. Non-Aqueous Ink Jet Ink Composition

The non-aqueous ink jet ink composition according to the present embodiment (in the present specification, simply referred to as "ink composition") contains a pigment, a non-aqueous solvent, and a surfactant, in which the composition contains an acetylene glycol-based surfactant having a HLB value of 1.0 to 6.0 as the surfactant. Hereinafter, components contained in the ink composition according to the present embodiment and components that can be contained therein will be described in detail.

1.1. Pigment

As the pigment used in the present embodiment, any of inorganic pigments and organic pigments can be used.

Examples of the organic pigments include azo pigments (for example, azo lake, insoluble azo pigment, condensed azo pigment, and chelate azo pigment), polycyclic pigments (for example, phthalocyanine pigment, perylene pigment, anthraquinone pigment, quinacridone pigment, dioxazine pigment, thioindigo pigment, isoindolinone pigments, and quinophthalone pigment), dye lakes (for example, basic dye lake and acid dye lake), nitro pigments, nitroso pigments, aniline blacks, and daylight fluorescent pigments. Examples of the inorganic pigments include carbon black, titanium dioxide, silica, and alumina. These pigments may be used alone, and may also be used in a mixture of two or more.

Particularly, examples of pigments for black ink may include carbon blacks, such as furnace black, lamp black, acetylene black, and channel black; metals or metal oxides, such as copper, iron, and titanium oxide; and organic pigments, such as orthonitroaniline black. In terms of obtaining higher optical density of an image, carbon black pigment having a dibutyl phthalate (DBP) absorption of 80 $cm^3$/100 g to 140 $cm^3$/100 g, measured according to JIS K6221, and having a nitrogen adsorption specific surface area of 100 $m^2$/g to 200 $m^2$/g, measured according to JIS K6217, is preferable.

The content of the pigment in the ink composition according to the present embodiment can be appropriately set as needed, and is not particularly limited. However, from the viewpoint of obtaining sufficient optical density of an image, the lower limit thereof is preferably 5.0 mass % or more, more preferably 6.0 mass % or more, and particularly preferably 7 mass % or more, with respect to the total mass of the ink composition. Further, from the viewpoint of ensuring continuous printing stability of ink, the upper limit thereof is preferably 15.0 mass % or less, more preferably 14.0 mass % or less, and particularly preferably 13.0 mass % or less, with respect to the total mass of the ink composition.

From the viewpoint of continuous ejection stability and storage stability of ink, the average particle size of the pigment is preferably 300 nm or less, more preferably 150 nm or less, and particularly preferably 100 nm or less. Here, the average particle size of the pigment can be measured by the dynamic light scattering-type particle size distribution measuring apparatus "LB-500" (manufactured by HORIBA Ltd.)

Further, in order to improve the dispersion stability of the pigment in the ink composition, a pigment dispersant may be added. Examples of the pigment dispersant include polyester-based polymer compounds, such as HINOACT KF1-M, T-6000, T-7000, T-8000, T-8350P, and T-8000E (all manufactured by Takeo Fine Chemical Co., Ltd.); SOLSPERSE 11200, 13940, 18000, 20000, 24000, 28000, 32000, 32500, 33500, 34000, 35200, and 37500 (all manufactured by LUBRIZOL Corporation); Disperbyk-161, 162, 163, 164, 166, 180, 190, 191, 192, 2091, and 2095 (all manufactured by BYK Japan KK); FLOWLEN DOPA-17, 22, 33, and G-700 (all manufactured by KYOEISHA CHEMICAL Co., Ltd.); AJISPER PB821 and PB711 (all manufactured by Ajinomoto Co., Inc.); and LP4010, LP4050, LP4055, POLYMER 400, 401, 402, 403, 450, 451, and 453 (all manufactured by EFKA Chemicals, Inc.). The content ratio of the pigment dispersant can be appropriately selected according to the pigment that is used, but is preferably 5 parts by mass to 200 parts by mass, and more preferably 30 parts by mass to 120 parts by mass, with respect to 100 parts by mass of the content of the pigment in the ink composition.

1.2. Non-Aqueous Solvent

The ink composition according to the present embodiment contains a non-aqueous solvent. Examples of the non-aqueous solvent include: non-polar organic solvents, such as aliphatic hydrocarbons, alicyclic hydrocarbons, and aromatic hydrocarbons; and polar organic solvents, such as ester-based solvents, alcohol-based solvents, ether-based solvents, and higher fatty acids.

Examples of the aliphatic hydrocarbons include paraffins and isoparaffins. Examples of the alicyclic hydrocarbons include cyclohexane, cyclooctane, and cyclodecane. Examples of the aromatic hydrocarbons include benzene, toluene, xylene, naphthalene, and tetralin. As the non-polar organic solvents, commercially-available products may also be used. Examples of the commercially-available products include aliphatic hydrocarbon-based and alicyclic hydrocarbon-based solvents, such as IP Solvent 1016, IP Solvent 1620, and IP Clean LX (all are trade names, manufactured by Idemitsu Kosan Co., Ltd.), Isopar G, Isopar L, Isopar H, Isopar M, Exxsol D40, Exxsol D80, Exxsol D100, Exxsol D130, and Exxsol D140 (all are trade names, manufactured by Exxon Corporation), NS Clean 100, NS clean 110, NS clean 200, and NS clean 220 (all are trade names, manufactured by JX Nippon Oil & Energy Corporation), and Naphtesol 160, Naphtesol 200, Naphtesol 220, AF-4, AF-6, and AF-7 (all are trade names, manufactured by JX Nippon Oil & Energy Corporation); and aromatic hydrocarbon-based solvents, such as Solvesso 200 (trade name, manufactured by Exxon Corporation), and Nippon Oil Clean Sol G (alkyl benzene, manufactured by JX Nippon Oil & Energy Corporation).

Examples of the ester-based solvents include methyl acetate, ethyl acetate, n-propyl acetate, isopropyl acetate, n-butyl acetate, isobutyl acetate, isopentyl acetate, sec-butyl acetate, amyl acetate, methoxybutyl acetate, methyl lactate, ethyl lactate, butyl lactate, methyl caprylate, methyl laurate, isopropyl laurate, hexyl laurate, isopropyl myristate, isopropyl palmitate, isooctyl palmitate, methyl oleate, ethyl oleate, isopropyl oleate, butyl oleate, methyl linoleate, isobutyl linoleate, ethyl linoleate, isobutyl linoleate, isopropyl isostearate, soybean oil methyl, soybean oil isobutyl, tall oil methyl, tall oil isobutyl, diisopropyl adipate, diisopropyl sebacate, diethyl sebacate, propylene glycol monocaprate, trimethylolpropane tri-2-ethylhexanoate, glyceryl tri-2-ethylhexanoate, ethylene glycol monomethyl ether acetate, ethylene glycol monoethyl ether acetate, propylene glycol monomethyl ether acetate, propylene glycol monoethyl ether acetate, diethylene glycol monomethyl ether acetate, diethylene glycol monoethyl ether acetate, and diethylene glycol monobutyl ether acetate.

Examples of the alcohol-based solvents include methanol, ethanol, isopropanol, 1-propanol, 1-butanol, 2-butanol, 3-pentanol, 2-methyl-1-butanol, 2-methyl-2-butanol, iso-amyl alcohol, 3-methyl-2-butanol, 3-methoxy-3-methyl-1-butanol, 4-methyl-2-pentanol, allyl alcohol, 1-hexanol, 1-heptanol, 2-heptanol, 3-heptanol, iso-myristyl alcohol, iso-palmityl alcohol, isostearyl alcohol, and oleyl alcohol.

Examples of the ether-based solvents include diethyl glycol monobutyl ether, ethylene glycol monobutyl ether, propylene glycol monobutyl ether, and propylene glycol dibutyl ether.

Examples of the higher fatty acids include isoarachic acid, isohexacosanoic acid, isononanoic acid, isomyristic acid, hexadecanoic acid, isopalmitic acid, oleic acid, and isostearic acid.

These non-aqueous solvents may be used alone, and may also be used in a mixture of two or more.

It is preferable that the non-aqueous solvent used in the present embodiment contains a non-polar organic solvent having a 50% distillation point of 280° C. or lower and a polar organic solvent having a 50% distillation point of 300° C. or higher, and the total content of the non-polar organic solvent and the polar organic solvent in the non-aqueous solvent is 60.0 mass % or more. In the case where the non-aqueous solvent contains the non-polar organic solvent having a 50% distillation point of 280° C. or lower, a solvent component is rapidly volatilized from the ink composition recorded on plain paper, and thus it is possible to effectively prevent bleed-through and oil bleeding. Further, in the case where the non-aqueous solvent contains the polar organic solvent having a 50% distillation point of 300° C. or higher, it is possible to prevent the drying properties of the ink from becoming too high. Moreover, in the case where the total content of these solvents in the non-aqueous solvent is 60.0 mass % or more, the drying properties of the ink becomes appropriate (that is, it is possible to prevent the ink from being excessively dried), and thus it is difficult to cause nozzle clogging in the vicinity of nozzles.

The 50% distillation point can be measured according to JIS K0066 "Test method for distillation of chemical products", and means a temperature at which 50% by weight of a solvent is volatilized. When the total content of the non-polar organic solvent having a 50% distillation point of 280° C. or lower and the polar organic solvent having a 50% distillation point of 300° C. or higher in the non-aqueous solvent is 60.0 mass % or more, a non-polar organic solvent having a 50% distillation point of higher than 280° C. and a polar organic solvent having a 50% distillation point of lower than 300° C. may be contained.

The content of the non-polar organic solvent having a 50% distillation point of 280° C. or lower is preferably 10.0 mass % or more, and more preferably 20.0 mass % or more, with respect to the total mass of the non-aqueous solvent. When the content of the non-polar organic solvent having a 50% distillation point of 280° C. or lower is within the above range, a solvent component is rapidly volatilized from the ink composition recorded on plain paper, and thus it is possible to effectively prevent bleed-through and oil bleeding.

The content of the polar organic solvent having a 50% distillation point of 300° C. or higher is preferably 10.0 mass % or more, and more preferably 15.0 mass % or more, with respect to the total mass of the non-aqueous solvent. When the content of the polar organic solvent having a 50% distillation point of 300° C. or higher is within the above range, it is possible to prevent the ink from being excessively dried, and thus it is difficult to cause nozzle clogging.

Examples of the polar organic solvent having a 50% distillation point of 300° C. or higher include soybean oil methyl, soybean oil isobutyl, methyl oleate, ethyl oleate, isostearyl alcohol, oleyl alcohol, isopalmitic acid, isostearic acid, isoarachic acid, isohexacosanoic acid, isopropyl isostearate, methyl linoleate, isobutyl linoleate, and tall oil isobutyl.

The content of the non-aqueous solvent in the non-aqueous ink jet ink composition according to the present embodiment is not particularly limited, but is preferably 50.0 mass % or more, more preferably 60.0 mass % or more, and particularly preferably 70.0 mass % or more, with respect to the total mass of the ink composition.

1.3. Specific Acetylene Glycol-Based Surfactant

The non-aqueous ink jet ink composition according to the present embodiment contains an acetylene glycol-based surfactant having a HLB value of 1 to 6 (specific acetylene glycol-based surfactant). When the ink composition contains the specific acetylene glycol-based surfactant, even in the case of increasing the concentration of the pigment in order to obtain sufficient optical density of an image, the specific acetylene glycol-based surfactant is adsorbed on the surface of the pigment to increase steric hindrance, thereby improving the dispersion stability of the pigment. Therefore, the aggregation of the pigment in the ink composition is reduced, so as to deteriorate thixotropic properties. Further, when the thixotropic properties deteriorate, viscosity difference due to shear rate decreases. For this reason, since the ink easily moves when a force is applied to the aggregated pigment, it is considered that the aggregate pigment is easily loosened even by a small force, and thus viscosity difference becomes small. The fact that the aggregate pigment is loosened even by a small force means that the ink becomes easy to move, which leads to ejection stability. That is, since the ink can be ejected even by a small force, it is possible to ensure the continuous ejection stability of the ink even in the case of increasing the concentration of the pigment. Moreover, when the ink composition contains the specific acetylene glycol-based surfactant, the wettability of the pigment itself increases to allow the pigment to have a high affinity for the non-aqueous solvent, so that the dispersion stability of the pigment is increased, and long-term storage stability is improved.

Here, the HLB value in the invention is a value for evaluating the hydrophilicity of a compound, which was proposed by Davies et al. For example, the HLB value is a numerical value obtained by the Davies method defined in the Literature "J. T. Davies and E. K. Rideal, "Interface Phenomena" 2nd ed. Academic Press, New York 1963", and refers to a value calculated by Equation (1) below.

$$HLB \text{ value} = 7 + \Sigma[1] + \Sigma[2] \qquad (1)$$

(in the above Equation, [1] represents the cardinal number of hydrophilic groups, and [2] represents the cardinal number of hydrophobic groups.)

In the specific acetylene glycol-based surfactant used in the present embodiment, the HLB value calculated by the Davies method is in a range of 1.0 to 6.0, and the lower limit of the HLB value is preferably 2.0 or more, and more preferably 3.0 or more. When the HLB value is within the above range, the specific acetylene glycol-based surfactant is easily adsorbed on the surface of the pigment (particularly, oil-soluble pigment), and thus the dispersion stability of the pigment is improved. As a result, the above-described effects are easily obtained in the ink composition, and thus the continuous ejection stability and long-term storage stability of the ink are improved. When an acetylene glycol-based surfactant having a HLB value of more than 6.0 is added, reverse micelles are formed toward the center of a hydrophilic group moiety in the non-aqueous solvent prior to the adsorption of the acetylene glycol-based surfactant on the surface of the pigment. As a result, it is difficult to obtain above-described effects in the ink composition, and thus the improvement in the continuous ejection stability and long-term storage stability of the ink cannot be seen.

The acetylene glycol-based surfactant refers to a nonionic surfactant having a symmetrical structure in which an acetylene group is located at the center. The specific acetylene glycol-based surfactant has a very stable molecular structure, and also has a small molecular weight. Therefore, when the specific acetylene glycol-based surfactant is adsorbed on the surface of the pigment, it is possible to effectively increase the dispersion stability of the pigment. Specific examples of the specific acetylene glycol-based surfactant include Surfynol 104 series (HLB value: 4), Surfynol 61 (HLB value: 6), Surfynol 420 (HLB value: 4), Surfynol DF110D (HLB value: 3), Surfynol SE series (HLB value: 6), and Surfynol 82 (HLB value: 4) (all are trade names, manufactured by Nissin Chemical Industry Co., Ltd.). The specific acetylene glycol-based surfactant may be used alone, and may also be used in a combination of two or more.

The content of the specific acetylene glycol-based surfactant in the non-aqueous ink jet ink composition according to the present embodiment is not particularly limited. However, from the viewpoint of improving the dispersion stability of the pigment, the lower limit thereof is preferably 0.5 mass % or more, and more preferably 1.0 mass % or more, with respect to the total mass of the ink composition. Further, from the viewpoint of ensuring the continuous printing stability of the ink, the upper limit thereof is preferably 15.0 mass % or less, and more preferably 10.0 mass % or less, with respect to the total mass of the ink composition. In the case where the upper limit of the content of the specific acetylene glycol-based surfactant exceeds 15.0 mass %, the molecular assembly (for example, micelles) of the specific acetylene glycol-based surfactant is formed in the ink composition, and these micelles behave like particles, and thus ejection failure occurs in some cases.

It is preferable that the content of the specific acetylene glycol-based surfactant in the ink composition is appropriately adjusted depending on the content of the pigment contained in the ink composition. Specifically, the ratio of the content of the pigment to the content of the specific acetylene glycol-based surfactant ([the content of the pigment]/[the content of the specific acetylene glycol-based surfactant]) in the ink composition is preferably, 0.1 or more and less than 3.0, more preferably 0.5 to 2.8, and particularly preferably 1 to 2.5. When the content ratio of the pigment to the specific acetylene glycol-based surfactant in the ink composition is within the above range, the specific acetylene glycol-based surfactant can be sufficiently adsorbed on the surface of the pigment, and the problem caused by an excess of the specific acetylene glycol-based surfactant (ejection failure caused by the formation of the molecular assembly) can be suppressed, thereby making the ejection stability and storage stability of the ink composition better.

1.4. Other Components

Components other than the above components may be further added to the ink composition according to the present embodiment. Examples of the components include a resin, a chelating agent, a preservative, a viscosity modifier, a dissolution aid, an antioxidant, and an antifungal agent.

1.4.1. Resin

The ink composition according to the present embodiment may further contain a resin for fixing the above-described pigment to a recording medium (hereinafter, also referred to as "fixing resin").

Examples of the fixing resin include fiber-based resins, such as acrylic resins, styrene acrylic resins, rosin-modified resins, phenol resins, terpene resins, polyester resins, polyamide resins, epoxy resins, vinyl acetate resins, vinyl chloride resins, cellulose acetate butyrate; and vinyltoluene-α-methyl styrene copolymer resins. Among these, at least one resin selected from the group consisting of acrylic resins and vinyl chloride resins is preferable. In the case where the ink composition contains these fixing resins, the fixing properties of the ink composition to a recording medium can be improved, and the abrasion resistance thereof can also be improved.

The solid content of the fixing resin in the ink composition according to the present embodiment is preferably 0.05 mass % to 15 mass %, and more preferably 0.1 mass % to 10.0 mass %. When the content of the fixing resin is within the above range, excellent fixing properties of the ink composition to a recording medium are obtained.

Acrylic Resin

As the acrylic resin, a copolymer composed of polymerizable monomers known in the related art can be used. Examples of the polymerizable monomers include acrylic acid esters, such as methyl acrylate, ethyl acrylate, isopropyl acrylate, n-butyl acrylate, and 2-ethylhexyl acrylate; methacrylic acid esters, such as methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate; carboxylic group-containing monomers, such as acrylic acid, methacrylic acid, maleic acid, fumaric acid, itaconic acid, mono-n-butyl maleate, mono-n-butyl fumarate, and mono-n-butyl itaconate; hydroxyl group-containing (meth)acrylic acid esters; amide group-containing monomers; glycidyl group-containing monomers; cyano group-containing monomers; hydroxyl group-containing allyl compounds; tertiary amino group-containing monomers; and alkoxysilyl group-containing monomers. These polymerizable monomers can be used alone or in a combination of two or more.

As the acrylic resin, commercially-available products may be used. Examples of the commercially-available products include Acrypet MF (trade name, manufactured by Mitsubishi Rayon Co., Ltd., acrylic resin), SUMIPEX LG (trade name, manufactured by Sumitomo Chemical Co., Ltd., acrylic resin), Paraloid B-series (trade name, manufactured by Rohm and Haas Co., Ltd., acrylic resins), and Parapet G-1000P (trade name, manufactured by KURARAY CO., LTD., acrylic resin). In the invention, (meth)acrylic acid means both acrylic acid and methacrylic acid, and (meth)acrylate means both acrylate and methacrylate.

Vinyl Chloride Resin

Examples of the vinyl chloride resin include copolymers of vinyl chloride with other monomers, such as vinyl acetate, vinylidene chloride, acrylic acid, maleic acid, and vinyl alcohol. Among these, a copolymer containing a constitutional unit derived from vinyl chloride and vinyl acetate (hereinafter, referred to as a "vinyl chloride-vinyl acetate copolymer") is preferable, and a vinyl chloride-vinyl acetate copolymer having a glass transition temperature of 60° C. to 80° C. is more preferable.

The vinyl chloride-vinyl acetate copolymer can be obtained by a general method, and, for example, can be obtained by suspension polymerization. Specifically, the vinyl chloride-vinyl acetate copolymer can be obtained by putting water, a dispersant and a polymerization initiator into a polymerization reactor, conducting deaeration and then injecting vinyl chloride and vinyl acetate into the polymerization reactor to perform suspension polymerization, or can be obtained by injecting a part of vinyl chloride and vinyl acetate into the polymerization reactor to start a reaction and performing suspension polymerization while injecting the remaining vinyl chloride during the reaction.

It is preferable that the vinyl chloride-vinyl acetate copolymer contains a vinyl chloride unit, as its constitution, in an amount of 70 mass % to 90 mass %. When the content of the vinyl chloride unit is within the above range, the vinyl chloride-vinyl acetate copolymer is stably dissolved in the ink composition, and thus the long-term storage stability of the ink composition is excellent. Further, the ejection stability of the ink composition is excellent, and thus the excellent fixing properties of the ink composition to a recording medium can be obtained.

The vinyl chloride-vinyl acetate copolymer, if necessary, may also be provided with other constitutional units in addition to the vinyl chloride unit and the vinyl acetate unit. Examples of the constitutional units include a carboxylic acid unit, a vinyl alcohol unit, and a hydroxyalkyl acrylate unit, and particularly preferably a vinyl alcohol unit. The vinyl chloride-vinyl acetate copolymer can be obtained by using monomers corresponding to the above-described constitutional units. Specific examples of the monomer providing a carboxylic acid unit include maleic acid, itaconic acid, maleic anhydride, itaconic anhydride, acrylic acid, and methacrylic acid. Specific examples of the monomer providing a hydroxyalkyl acrylate unit include hydroxyethyl (meth)acrylate and hydroxyethyl vinyl ether. The content of these monomers is not limited as long as the effects of the invention are deteriorated, but, for example, these monomers can be copolymerized within a range of 15 mass % or less with respect to the total amount thereof.

As the vinyl chloride-vinyl acetate copolymer, commercially-available products may be used. Examples of the commercially-available products include SOLBIN CN, SOLBIN CNL, SOLBIN CSR, SOLBIN TA5R, SOLBIN CL, and SOLBIN CLL (all, manufactured by Nissin Chemical Industry Co., Ltd.).

The average polymerization degree of these resins is not particularly limited, but is preferably 150 to 1100, and more preferably 200 to 750. When the average polymerization degree of these resins is within the above range, these resins are stably dissolved in the ink composition according to the present embodiment, and thus the long-term storage stability of the ink composition is excellent. Further, the ejection stability of the ink composition is excellent, and thus the excellent fixing properties of the ink composition to a recording medium can be obtained. Meanwhile, the average polymerization degree of these resins, which is a value calculated from the measured specific viscosity, can be obtained according to the average polymerization degree calculation method described in "JIS K6720-2".

The number average molecular weight of these resins is not particularly limited, but is preferably 10000 to 50000, and more preferably 12000 to 42000. The number average molecular weight thereof can be measured by GPC, and can be determined as a relative value obtained by the conversion of polystyrene.

1.4.2. Others

The ink composition according to the present embodiment can further contain materials for imparting predetermined performance, such as a chelating agent (ethylene diamine tetraacetate (EDTA)), a preservative, a viscosity modifier, a dissolution aid, an antioxidant, and an antifungal agent, in addition to the above-described components.

1.5. Physical Properties

In the ink composition according to the present embodiment, from the viewpoint of being used as an ink jet ink, the viscosity (viscosity at 20° C.) thereof is set to preferably 2.0 mPa·s to 20.0 mPa·s, and more preferably 3.0 mPa·s to 15.0 mPa·s by adjusting the composition and combination thereof. Thus, the ejection stability (stability of ejection amount or flight characteristics of droplets) or ejection responsiveness (response speed or high frequency correspondence (frequency characteristics)) of the ink jet ink can be made excellent. The viscosity of the ink jet ink can be obtained by the JIS Z8809-based measurement using a vibration type viscometer.

In the shear viscosity measurement of the ink composition according to the present embodiment at 20° C. by a rheometer, the difference in the shear viscosity of the ink composition between a shear rate of 20[1/s] and a shear rate of 50[1/s] is preferably 0.60[mPa·s] or less, more preferably 0.50[mPa·s] or less, further preferably 0.40[mPa·s] or less, and particularly preferably 0.30[mPa·s] or less. When the difference in the shear viscosity of the ink composition between a shear rate of 20[1/s] and a shear rate of 50[1/s] is within the above range, since the viscosity difference of the ink composition according to the shear rate is sufficiently small, the aggregated pigment is easily loosened only by applying a small force, and thus the ejection stability of the ink is further improved.

Here, as the method of measuring the shear viscosity of the ink composition, there is exemplified a method in which a cone plate (diameter 75 mm, angle 1°) mounted in a viscoelasticity measuring apparatus (apparatus name "Physica MCR301", manufactured by Anton Paar Corporation) is filled with the ink composition, and the shear viscosity of the ink composition at 20° C. with respect to a shear rate ($10\ s^{-1}$ to $1000\ s^{-1}$) is measured.

1.6. Use

The non-aqueous ink jet ink composition according to the present embodiment is an ink for use in ink jet recording. The ink jet recording apparatus is not particularly limited, but is preferably a drop-on-demand type ink jet recording apparatus. The drop-on-demand type ink jet recording apparatus employs a piezoelectric element recording method for performing recording using a piezoelectric element disposed in a recording head and a thermal jet recording method for performing recording using thermal energy generated by a heater of a heat resistor element disposed in a recording head, but any of these recording methods can also be employed. Further, since the non-aqueous ink jet ink composition according to the present embodiment has an advantage of being inactive against an ink-repellent treated ejection nozzle surface, this non-aqueous ink jet ink composition is advantageous even in an ink jet recording method in which an ink is ejected from an inkjet recording head having an ink-repellent treated ejection nozzle surface.

The use of the non-aqueous ink jet ink composition according to the present embodiment is not particularly limited, but is suitable as an ink for a high-speed ink jet printer using plain paper because sufficient optical density of an image can be obtained in the recording onto plain paper and ejection stability and storage stability are good.

2. Examples

Hereinafter, the invention will be described in detail based on the following Examples, but is not limited to these Examples. The "part" and "%" in Examples and Comparative Examples are mass standards unless otherwise specified.

2.1. Preparation of Black Pigment Dispersion

Black Pigment Dispersion 1

13 parts by mass of soybean oil methyl, 15 parts by mass of soybean oil isobutyl, 10 parts by mass of ethyl oleate, 10 parts by mass of isostearyl alcohol, 17 parts by mass of a hydrocarbon-based solvent (AF-4, manufactured by JX Nippon Oil & Energy Corporation), and 15 parts by mass of a hydrocarbon-based solvent (AF-6, manufactured by JX Nippon Oil & Energy Corporation) were mixed. Then, 5 parts by mass of Solsperse 13940 (trade name, manufactured by Lubrizol Corporation), as a dispersant, was dissolved in the mixture, and 15 parts by mass of carbon black (MA-100, manufactured by Mitsubishi Chemical Corporation) was added to be premixed. Thereafter, the resulting product was dispersed by a bead mill for a residence time of about 20 minutes to obtain black pigment dispersion 1.

When the dibutyl phthalate (DBP) absorption amount per the above carbon black (MA-100, manufactured by Mitsubishi Chemical Corporation) was measured according to JIS K6221, it was 100 $cm^3$/100 g. Further, when the nitrogen adsorption specific surface area was measured according to JIS K6217, it was 110 $m^2$/g.

Black Pigment Dispersion 2

10 parts by mass of soybean oil methyl, 13 parts by mass of soybean oil isobutyl, 10 parts by mass of ethyl oleate, 10 parts by mass of isostearyl alcohol, 17 parts by mass of a hydrocarbon-based solvent (AF-4, manufactured by JX Nippon Oil & Energy Corporation), and 15 parts by mass of a hydrocarbon-based solvent (AF-6, manufactured by JX Nippon Oil & Energy Corporation) were mixed. Then, 5 parts by mass of Solsperse 13940 (trade name, manufactured by Lubrizol Corporation), as a dispersant, was dissolved in the mixture, and 20 parts by mass of carbon black (SAF-HS, manufactured by Tokai Carbon Co., Ltd.) was added to be premixed. Thereafter, the resulting product was dispersed by a bead mill for a residence time of about 20 minutes to obtain black pigment dispersion 2.

When the dibutyl phthalate (DBP) absorption amount per the above carbon black (SAF-HS, manufactured by Tokai Carbon Co., Ltd.) was measured according to JIS K6221, it was 130 $cm^3$/100 g. Further, when the nitrogen adsorption specific surface area was measured according to JIS K6217, it was 142 $m^2$/g.

2.2. Preparation of Ink Composition

Any of the above prepared black pigment dispersions was weighed and put into a beaker to have pigment concentration described in Table. Then, a hydrocarbon-based solvent (AF-4, manufactured by JX Nippon Oil & Energy Corporation), an ester-based solvent (manufactured by Kao Corporation, trade name "EXCEPARL M-OL", methyl oleate), and a surfactant described in Table were added, and the resulting mixture was sufficiently mixed and stirred, so as to prepare each ink composition.

Measurement of Shear Viscosity Difference (Δ Shear Viscosity)

A cone plate (diameter 75 mm, angle 1°) mounted in a viscoelasticity measuring apparatus (apparatus name "Physica MCR301", manufactured by Anton Paar Corporation) was filled with the above-obtained ink composition, and the shear viscosity of the ink composition at 20° C. with respect to a shear rate ($10 \text{ s}^{-1}$ to $1000 \text{ s}^{-1}$) was measured. Further, the shear viscosity of the ink composition at a shear rate of $20 \text{ s}^{-1}$ and the shear viscosity of the ink composition at a shear rate of $500 \text{ s}^{-1}$ were determined, and the difference therebetween was evaluated.

2.3. Evaluation Test of Ink Composition

Continuous Printing Stability 30 sheets of a solid pattern having a recording resolution of 600 dpi×600 dpi were continuously recorded on A4 size Xerox P paper at room temperature using an ink jet printer "PX-B700" manufactured by Seiko Epson Corporation. The continuous printing stability of the ink composition was evaluated by the number of sheets of missing recorded products among the 30 sheets of recorded products. Evaluation criteria are as follows.

A: the number of sheets of missing recorded products is less than 10.
B: the number of sheets of missing recorded products is 10 or more and less than 20.
C: the number of sheets of missing recorded products is 20 or more.

OD

A solid pattern having a recording resolution of 600 dpi×600 dpi was recorded on A4 size Xerox P paper at room temperature using an ink jet printer "PX-B700" manufactured by Seiko Epson Corporation. The recorded product was dried, and then the OD of the recorded product was measured and evaluated by SPECTROLINO (manufactured by Gretag Macbeth Corporation). Evaluation criteria are as follows.

A: 1.1 or more
B: more than 1.0 and less than 1.1
C: less than 1.0

Storage Stability

The above-prepared ink composition was put into a sealed container, and left at 70° C. for 9 days. The viscosity of the ink composition immediately after preparation and the viscosity of the ink composition after leaving were measured by the JIS Z8809-based method using a vibration type viscometer to determine the change rate thereof. Evaluation criteria are as follows.

A: the change rate of viscosity is less than 5%.
B: the change rate of viscosity is 5% or more and less than 10%.
C: the change rate of viscosity is 10% or more.

2.4. Evaluation Results of Ink Composition

The composition ratios and evaluation results of each ink composition are shown in Table below.

TABLE

| | | Example 1 | Example 2 | Example 3 | Example 4 | Example 5 | Example 6 | Example 7 |
|---|---|---|---|---|---|---|---|---|
| Pigment | Carbon black (MA-100) | 7.5 | 5.1 | 9.0 | — | 6.0 | 10.5 | 3.0 |
| | Carbon black (SAF-HS) | — | — | — | 15.0 | — | — | — |
| Non-aqueous solvent | Non-polar organic solvent | Hydrocarbon-based solvent (AF-4) | 25.5 | 36.8 | 31.2 | 22.7 | 41.8 | 26.9 | 62.4 |
| | | Hydrocarbon-based solvent (AF-6) | 7.5 | 5.1 | 9.0 | 11.2 | 6.0 | 10.5 | 3.0 |
| | Polar organic solvent | Soybean oil methyl (ester-based solvent) | 6.5 | 4.4 | 7.8 | 7.5 | 5.2 | 9.1 | 2.6 |
| | | Soybean oil isobutyl (ester-based solvent) | 7.5 | 5.1 | 9.0 | 9.8 | 6.0 | 10.5 | 3.0 |
| | | Methyl oleate (ester-based solvent) | 30.0 | 30.0 | 15.0 | 9.0 | 20.0 | 10.0 | 20.0 |
| | | Ethyl oleate (ester-based solvent) | 5.0 | 3.4 | 6.0 | 7.5 | 4.0 | 7.0 | 2.0 |
| | | Isostearyl alcohol | 5.0 | 3.4 | 6.0 | 7.5 | 4.0 | 7.0 | 2.0 |
| Dispersant | Solsperse 13940 | 2.5 | 1.7 | 3.0 | 3.8 | 2.0 | 3.5 | 1.0 |
| Surfactant | Surfynol 104PG50 (HLB value = 4) | 3.0 | 5.0 | 4.0 | 6.0 | — | — | 1.0 |
| | Surfynol 61 (HLB value = 6) | — | — | — | — | 5.0 | — | — |
| | Surfynol DF100D (HLB value = 3) | — | — | — | — | — | 5.0 | — |
| | Surfynol 465 (HLB value = 13) | — | — | — | — | — | — | — |
| | Newcol 723 (HLB value = 16.6) | — | — | — | — | — | — | — |
| | Silface SAG503A (HLB value = 11) | — | — | — | — | — | — | — |
| | Total amount | 100.0 | 100.0 | 100.0 | 100.0 | 100.0 | 100.0 | 100.0 |
| | Content of non-aqueous solvent | 87.0 | 88.2 | 84.0 | 75.2 | 87.0 | 81.0 | 95.0 |
| | Δ shear viscosity difference | 0.21 | 0.29 | 0.56 | 0.11 | 0.08 | 0.35 | 0.05 |
| | [content of pigment]/[content of surfactant] | 2.50 | 1.02 | 2.25 | 2.50 | 1.20 | 2.10 | 3.00 |
| Evaluation results | Continuous printing stability | A | A | B | B | A | A | A |
| | OD | A | B | A | A | A | A | B |
| | Storage stability | A | A | A | A | A | A | A |

| | | Example 8 | Example 9 | Comparative Example 1 | Comparative Example 2 | Comparative Example 3 | Comparative Example 4 |
|---|---|---|---|---|---|---|---|
| Pigment | Carbon black (MA-100) | 10.5 | 7.2 | 7.5 | 7.5 | 5.1 | 7.5 |
| | Carbon black (SAF-HS) | — | — | — | — | — | — |
| Non-aqueous solvent | Non-polar organic solvent | Hydrocarbon-based solvent (AF-4) | 26.9 | 30.2 | 28.5 | 38.5 | 50.8 | 25.5 |
| | | Hydrocarbon-based solvent (AF-6) | 10.5 | 7.2 | 7.5 | 7.5 | 5.1 | 7.5 |
| | Polar organic solvent | Soybean oil methyl (ester-based solvent) | 9.1 | 6.2 | 6.5 | 6.5 | 4.4 | 6.5 |
| | | Soybean oil isobutyl (ester-based solvent) | 10.5 | 7.2 | 7.5 | 7.5 | 5.1 | 7.5 |
| | | Methyl oleate (ester-based solvent) | 10.0 | 20.0 | 30.0 | 15.0 | 15.0 | 30.0 |

| | | | | | | | |
|---|---|---|---|---|---|---|---|
| | Ethyl oleate (ester-based solvent) | 7.0 | 4.8 | 5.0 | 5.0 | 3.4 | 5 |
| | Isostearyl alcohol | 7.0 | 4.8 | 5.0 | 5.0 | 3.4 | 5 |
| Dispersant | Solsperse 13940 | 3.5 | 2.4 | 2.5 | 2.5 | 1.7 | 2.5 |
| Surfactant | Surfynol 104PG50 (HLB value = 4) | 5.0 | 10.0 | — | — | — | — |
| | Surfynol 61 (HLB value = 6) | — | — | — | — | — | — |
| | Surfynol DF100D (HLB value = 3) | — | — | — | — | — | — |
| | Surfynol 465 (HLB value = 13) | — | — | — | — | 6.0 | — |
| | Newcol 723 (HLB value = 16.6) | — | — | — | 5.0 | — | — |
| | Silface SAG503A (HLB value = 11) | — | — | — | — | — | 3.0 |
| | Total amount | 100.0 | 100.0 | 100.0 | 100.0 | 100.0 | 100.0 |
| | Content of non-aqueous solvent | 81.0 | 80.4 | 90.0 | 85.0 | 87.2 | 87.0 |
| | Δ shear viscosity difference | 0.37 | 0.25 | 1.02 | 0.67 | 0.50 | 0.25 |
| | [content of pigment]/[content of surfactant] | 2.10 | 0.72 | 0.00 | 1.50 | 0.85 | 2.50 |
| Evaluation results | Continuous printing stability | A | A | C | B | A | C |
| | OD | A | A | A | C | A | A |
| | Storage stability | A | A | A | C | C | C |

Among the components used in Table, those described except compound names are as follows.

Pigment

Carbon black (MA-100) (trade name, manufactured by Mitsubishi Chemical Corporation)

Carbon black (SAF-HS) (trade name, manufactured by Tokai Carbon Co., Ltd.)

Non-Aqueous Solvent (Non-Polar Organic Solvent)

Hydrocarbon-based solvent (AF-4) (trade name, manufactured by JX Nippon Oil & Energy Corporation, naphthenic solvent, 50% distillation point: 257.5° C.)

Hydrocarbon-based solvent (AF-6) (trade name, manufactured by JX Nippon Oil & Energy Corporation, naphthenic solvent, 50% distillation point: 315.5° C.)

Non-Aqueous Solvent (Polar Organic Solvent)

Soybean oil methyl (ester-based solvent, 50% distillation point: 345.0° C.)

Soybean oil isobutyl (ester-based solvent, 50% distillation point: 356.5° C.)

Methyl oleate (trade name "EXCEPARL M-OL", manufactured by Kao Corporation, ester-based solvent, 50% distillation point: 334.0° C.)

Ethyl oleate (ester-based solvent, 50% distillation point: 344.5° C.)

Isostearyl alcohol (alcohol-based solvent, 50% distillation point: 301.0° C.)

Dispersant

Solsperse 13940 (trade name, manufactured by LUBRIZOL Corporation)

Surfactant

Surfynol 104PG50 (trade name, manufactured by Nissin Chemical Industry Co., Ltd., propylene glycol-containing acetylene glycol-based surfactant, HLB value: 4)

Surfynol 61 (trade name, manufactured by Nissin Chemical Industry Co., Ltd., acetylene glycol-based surfactant, HLB value: 6)

Surfynol DF100D (trade name, manufactured by Nissin Chemical Industry Co., Ltd., dipropylene glycol-containing acetylene glycol-based surfactant, HLB value: 3)

Surfynol 465 (trade name, manufactured by Nissin Chemical Industry Co., Ltd., acetylene glycol-based surfactant, HLB value: 13)

Newcol 723 (trade name, manufactured by Nippon Nyukazai Co., Ltd., polyoxyethylene polycyclic phenyl ether, HLB value: 16.6)

Silface SAG503A (trade name, manufactured by Nissin Chemical Industry Co., Ltd., HLB value: 11)

As shown in Table, according to the ink compositions of Examples 1 to 9, it was found that, as pigment concentration increases, an image having excellent optical density (OD) is obtained, and that, even in the case of increasing the pigment concentration, the storage stability of the ink composition is made good without deteriorating the continuous ejection stability of the ink composition by adding the specific acetylene glycol-based surfactant.

In contrast, according to the ink compositions of Comparative Examples 1 to 4, it was found that, if a surfactant other than the specific acetylene glycol-based surfactant is added, good results of at least one item of continuous ejection stability, optical density (OD), and storage stability cannot be obtained.

The invention can be variously modified without being limited to the above-mentioned embodiments. For example, the invention includes substantially the same configurations as those described in the embodiments (for example, configurations having the same function, method and result or configurations having the same object and effect). The invention includes configurations that replace non-essential parts of the configurations described in the embodiments. The invention includes configurations that can achieve the same action and effect as those described in the embodiments or the same purpose as the configurations described in the embodiments. The invention includes configurations obtained by applying known technologies to the configurations described in the embodiments.

The entire disclosure of Japanese Patent Application No. 2015-050544, filed Mar. 13, 2015 is expressly incorporated by reference herein.

What is claimed is:

1. A non-aqueous ink jet ink composition, comprising:
a pigment;
a non-aqueous solvent; and
a surfactant,
wherein the ink composition contains an acetylene glycol-based surfactant having a HLB value of 1.0 to 6.0 as the surfactant,
the ink composition does not contain a non-ionic surfactant having a HLB value greater than 6.0,
the non-aqueous solvent contains a non-polar organic solvent having a 50% distillation point of 280° C. or lower and a polar organic solvent having a 50% distillation point of 300° C. or higher,
the total content of the non-polar organic solvent and the polar organic solvent in the non-aqueous solvent is 60.0 mass % or more, and
a content of the polar organic solvent is 10.0 mass % or more.

2. The non-aqueous ink jet ink composition according to claim 1, wherein, in the shear viscosity measurement of the ink composition at 20° C. by a rheometer, the difference in shear viscosity of the ink composition between a shear rate of 20[1/s] and a shear rate of 50[1/s] is 0.60[mPa·s] or less.

3. The non-aqueous ink jet ink composition according to claim 1,
wherein the ratio of the content of the pigment to the content of the acetylene glycol-based surfactant ([the content of the pigment]/[the content of the acetylene glycol-based surfactant]) in the ink composition is 0.1 or more and less than 3.0.

4. The non-aqueous ink jet ink composition according to claim 1,
wherein the content of the pigment is 5.0 mass % to 15.0 mass % with respect to the total mass of the ink composition.

5. The non-aqueous ink jet ink composition according to claim 1,
wherein the non-polar organic solvent contains at least one selected from the group consisting of aliphatic hydrocarbons, alicyclic hydrocarbons, and aromatic hydrocarbons.

6. The non-aqueous ink jet ink composition according to claim 1,
wherein the polar organic solvent contains at least one selected from the group consisting of soybean oil methyl, soybean oil isobutyl, methyl oleate, ethyl oleate, isostearyl alcohol, oleyl alcohol, isopalmitic acid, isostearic acid, isoarachic acid, isohexacosanoic acid, isopropyl isostearate, methyl linoleate, isobutyl linoleate, and tall oil isobutyl.

7. The non-aqueous ink jet ink composition according to claim 1,
wherein the polar organic solvent contains either isoarachic acid or isohexacosanoic acid.

* * * * *